W. H. GAMBLE.
VEHICLE FRAME.
APPLICATION FILED MAR. 5, 1913.
1,134,952.
Patented Apr. 6, 1915.
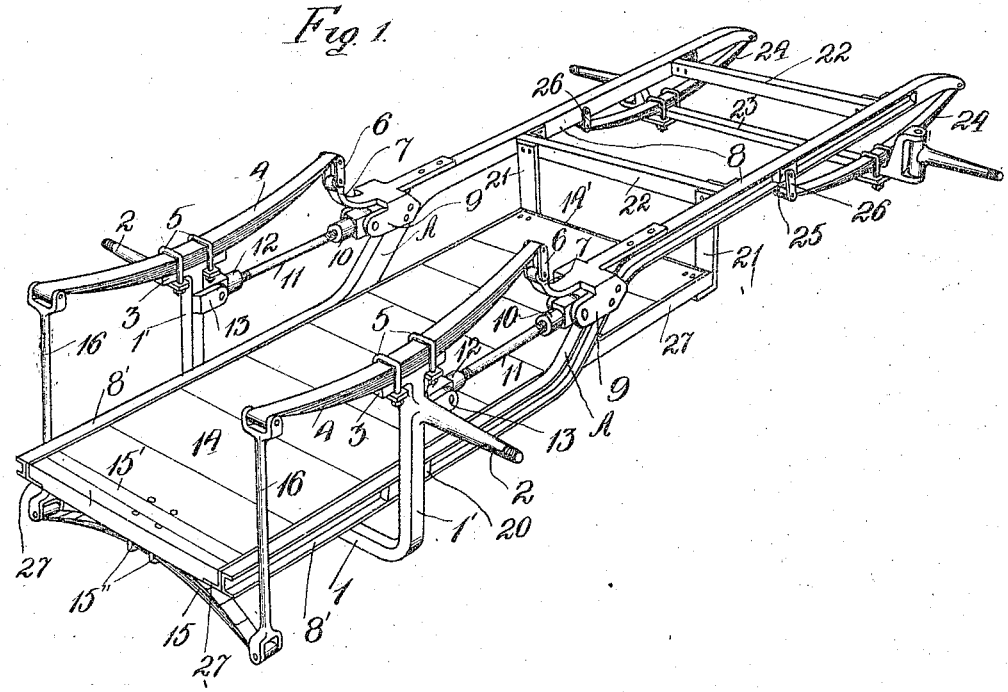
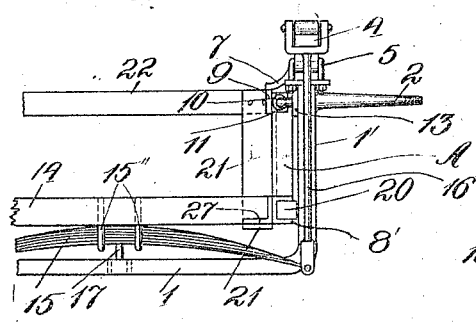
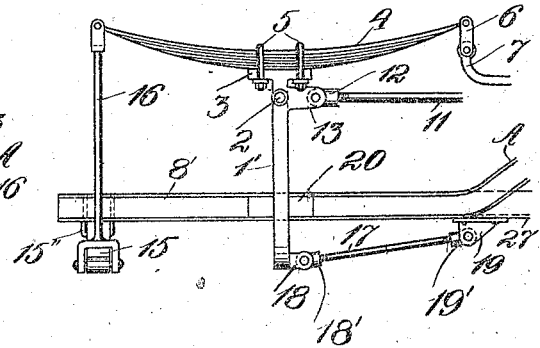
Witnesses:
J. T. Thomas
Jas. H. Smith
Inventor
Walter H. Gamble
By ⎯⎯⎯⎯
His Attorney

UNITED STATES PATENT OFFICE.

WALTER H. GAMBLE, OF LOS ANGELES, CALIFORNIA.

VEHICLE-FRAME.

1,134,952. Specification of Letters Patent. Patented Apr. 6, 1915.

Application filed March 5, 1913. Serial No. 752,084.

*To all whom it may concern:*

Be it known that I, WALTER H. GAMBLE, a citizen of the United States, residing at Los Angeles, in the county of Los Angeles and State of California, have invented a certain new and useful Vehicle-Frame, of which the following is a specification.

My invention relates to a vehicle frame, and particularly to an improvement over that class of constructions more particularly described and claimed in my co-pending application for patent filed June 18, 1912, Serial Number 704,461, and has for one of its objects to provide a construction in which the platform of the vehicle may be hung as low as possible.

Another object of this invention is to provide a frame, and a platform which is rigid with the frame, the rear of which is suspended from an axle by flexible means, whereby the wheels may negotiate uneven and rough surfaces without distorting or unduly straining the frame and platform, and in which the weight is carried and supported over the rear axle, as distinguished from the construction set forth in my said above mentioned application, by both the frame and platform, which constitute an integral unit.

A further object of this invention is to provide a frame, with a platform rigidly connected thereto, in which the construction is such that the propelling mechanism is carried by the forward portion of said frame on a higher plane than the platform.

Other objects will appear from the following specification, in connection with the accompanying drawing, in which, Figure 1, is a perspective view illustrating a preferred embodiment of my invention. Fig. 2, is a fragmentary rear elevation, and Fig. 3, is a fragmentary side elevation.

Referring in detail to the drawing, like numerals of reference designating like parts, 1, designates an axle, preferably U-shaped, provided with spindles 2, for wheels, not shown, and with perches 3, located centrally with and at the top of the upright arms 1', of the axle 1, for preferably upwardly curved flat springs 4, which are secured to the said perches 3, by U-bolts 5, or in any other manner. To the forward ends of said springs 4, are pivotally attached links 6, which in turn are pivotally attached to arms 7, rigidly connected to the forward portions 8, of the frame. Said arms 7, may be provided with bifurcations 9, between the tines of which are pivotally mounted heads 10, into which the ends of rods 11, are screwed, while the other ends of said rods are screwed into the heads 12, pivotally mounted between the tines of bifurcations 13, which may be integral with the arms 1', of the axle 1. These rods 11, are adjustable to hold the axle 1, in proper position, and also serve to transmit the driving or retarding force of the driving wheels from the axle 1, to the forward portions 8, of the frame, for which purpose the rods 11, are in preferably horizontal alinement with said forward portions 8, of the frame.

The forward portions 8, of the frame, are on a higher plane than the rear portions 8', the continuity of the frame being maintained by intermediate bends, as seen at A.

27 are frame members, forming part of the frame portions 8', and serve to receive the platform 14. Said members 27, extend beyond the bends A, under and parallel to the forward portions 8, of the frame, suitable hangers 21, being provided to rigidly suspend the forward ends of the members 27, from one of the cross-members 22, which are provided between the said portions 8, of the frame, to strengthen the structure and support the propelling mechanism. The forward ends of the frame members 27, are connected by a cross-member 14.

The rear ends of the frame members 27, are connected by a rigid cross-member 15', to the underside of which is fastened, by U-bolts 15'', preferably a downwardly curved flat spring 15, the ends of which are hung from the said aforementioned springs 4, by rods 16, or in any other manner, the rods 16, having a pivotal connection with all of said mentioned springs. Disposed preferably centrally of the horizontal portion of the rear axle 1, is a bifurcation 18, in which is pivotally mounted a head 18', for one end of a rod 17, the other end of which is screwed into a head 19', pivotally mounted in a bifurcation 19, which may be fastened to the underside of the platform 14. This rod is adjustable and serves primarily to hold the upright arms 1', of the axle 1, in a vertical plane.

To prevent lateral movement of the axle 1, relatively to the frame, chafe plates 20, are inserted and secured preferably in the channel portions 8', of the frame, which plates bear against the inner faces of the upright arms 1', of the axle 1.

23 designates the front axle, on which are fastened springs 24, for supporting the front portions 8, of the frame. The forward ends of said spring 24, are pivotally connected directly to the ends of the frame, while the rear ends of said springs 24, are pivotally connected to the links 26, which in turn are pivotally hung from blocks 25, secured to the frame portions 8.

What I claim, is:—

1. A vehicle construction comprising a frame whose rear portion is on a lower parallel plane than the forward portion, a U-shaped rear axle, springs on said axle and above said frame and connected with said frame forward of the axle, a spring below the lower portion of said frame and below the springs on said axle, and means connecting said last named spring with said first named springs.

2. A vehicle construction comprising a front axle, a U-shaped rear axle, a frame and platform forming an integral unit, a spring support for the rear of said frame and platform, a spring suspension attached to said frame and supported on said rear axle and connected with said spring support, means to support the forward end of said frame on said front axle, and means to hold the upright arms of said rear axle in vertical alinement.

3. A vehicle construction comprising a front axle and a U-shaped rear axle, a frame and platform forming an integral unit, means to flexibly suspend the rear portion of said frame and platform from and above said rear axle, means to flexibly support the forward portion of said frame on said front axle, means to transmit force from the rear axle to the forward portions of the frame, and means coöperating with said force-transmitting means to hold said rear axle in vertical alinement.

4. A vehicle construction comprising a front axle and a U-shaped rear axle having spindles, a frame and a platform forming an integral unit, means to flexibly suspend the rear portion of said frame and platform from said rear axle, means to flexibly support the front portion of said frame on said front axle, adjustable means to transmit force from the rear axle to the frame, and means connected with the cross-member of said rear axle to hold the upright members thereof in vertical alinement with said spindles.

5. A vehicle construction comprising a U-shaped rear axle, a frame having its rear portion on a lower parallel plane than its forward portion and lying below the top of and between the upright arms of said axle, springs on the arms of said axle connected at their forward ends with the forward portion of said frame, and a transverse spring on the bottom of said rear portion of said frame and connected with the rear ends of said springs on said axle arms to flexibly suspend the rear of said frame.

6. A vehicle construction comprising a U-shaped rear axle the upright arms of which are provided with spindles, a frame having its rear portion on a lower parallel plane than its front portion and lying below said spindles and between said upright arms, springs on said axle arms, means connecting the forward portion of said springs with the forward portion of said frame, means connecting the rear of said springs with the rear of said frame, a front axle, and a flexible support for the front of said frame.

7. A vehicle construction comprising a U-shaped axle, the upright arms of which are provided with spindles, a frame having its rear portion on a lower parallel plane than its front portion and lying below said spindles and between said upright arms, springs on said axle arms pivotally connected at their forward ends with the forward portion of said frame, hangers connected with the rear ends of said springs to flexibly suspend the rear of said frame from said springs, a front axle, and a flexible support for the front of said frame.

8. A vehicle construction comprising a frame whose front portion lies on a higher parallel plane than the rear portion, a rear axle, a platform integral and on the same plane with said frame for part of its length, a spring on the bottom of said frame, means carried by the axle and connected with the front of said frame and also with said spring on the bottom of said frame, to flexibly suspend said frame from and above said rear axle, a front axle, and a flexible support on said front axle for the front of said frame.

9. A vehicle construction comprising a frame whose front portion lies on a higher parallel plane than the rear portion, a U-shaped rear axle provided with perches located centrally and at the top of the upright members of said axle, springs on said perches having their forward ends connected to the forward portion of the frame, a spring fastened to the bottom of and at the rear of said frame, means connecting the ends of said spring with the rear ends of said springs on said perches, a platform integral with said frame and on the same plane therewith for a portion of its length, means to hold said rear axle in vertical alinement, a front axle, and means to flexibly support the front of said frame from said front axle.

10. A vehicle construction comprising a U-shaped rear axle having spindles, springs on said rear axle, a frame and platform forming an integral unit and suspended from said springs, means above and below said frame and platform co-acting to hold the upright arms of said axle in vertical alinement with said spindles, and means connected to said frame to prevent lateral movement of said axle.

11. A vehicle construction comprising a front axle, a U-shaped rear axle, a frame and platform forming an integral unit, a spring suspension on said rear axle for said frame, a spring support from said spring suspension to support the rear of said frame and platform from and above said rear axle, means to flexibly support the forward end of said frame on said front axle, and means to hold the upright members of said U-shaped axle in vertical position.

In testimony whereof I affix my signature in the presence of two witnesses.

WALTER H. GAMBLE.

Witnesses:
 ANTON GLOETZNER, Jr.,
 GEORGE BUTTREN.